United States Patent
Ylitalo (10) Patent No.: US 7,218,070 B2
(45) Date of Patent: May 15, 2007

(54) SYSTEM AND METHOD FOR BRAKING A MOTOR OF A PROPULSION UNIT

(75) Inventor: Jari Ylitalo, Vantaa (FI)

(73) Assignee: ABB O Y, Helsinki (FI)

( * ) Notice: Subject to any disclaimer, the term of this patent is extended or adjusted under 35 U.S.C. 154(b) by 0 days.

(21) Appl. No.: 10/507,379

(22) PCT Filed: Mar. 28, 2003

(86) PCT No.: PCT/FI03/00244

§ 371 (c)(1),
(2), (4) Date: Mar. 18, 2005

(87) PCT Pub. No.: WO03/084045

PCT Pub. Date: Oct. 9, 2003

(65) Prior Publication Data

US 2005/0170716 A1    Aug. 4, 2005

(30) Foreign Application Priority Data

Mar. 28, 2002    (FI) .................................. 20020619

(51) Int. Cl.
*H02P 3/14* (2006.01)
*H02P 5/22* (2006.01)
*B63B 35/00* (2006.01)
*B60L 11/02* (2006.01)

(52) U.S. Cl. ...................... 318/376; 318/362; 318/148; 290/17; 440/1; 440/71; 440/74

(58) Field of Classification Search ................ 318/376, 318/148, 721; 440/74; 290/17
See application file for complete search history.

(56) References Cited

U.S. PATENT DOCUMENTS

| 1,481,853 | A | * | 1/1924 | Alexanderson | ............... 318/57 |
| 1,555,244 | A | | 9/1925 | Gazda | |
| 2,451,936 | A | * | 10/1948 | Frisch | .......... 318/147 |
| 3,812,411 | A | * | 5/1974 | Johnson et al. | ............. 318/376 |
| 3,993,912 | A | * | 11/1976 | Ekstrom et al. | ............... 290/17 |
| 3,997,824 | A | * | 12/1976 | Beverley et al. | ............. 318/144 |
| 4,024,443 | A | * | 5/1977 | Schmucker et al. | ........ 318/721 |
| 4,316,722 | A | * | 2/1982 | Aschauer | ...................... 440/74 |
| 4,338,525 | A | * | 7/1982 | Kilgore | ....................... 290/17 |
| 6,592,412 | B1 | * | 7/2003 | Geil et al. | ...................... 440/6 |

FOREIGN PATENT DOCUMENTS

| DE | 26 20 346 | 5/1976 |
| DE | 26 20 346 A | 11/1977 |
| EP | 0 090 423 | 5/1983 |
| EP | 0 742 637 | 5/1996 |
| SU | 901 099 A | 1/1982 |
| SU | 901099 | 2/1982 |
| WO | WO 97/05691 | 2/1997 |

\* cited by examiner

*Primary Examiner*—Paul Ip
(74) *Attorney, Agent, or Firm*—Arent Fox LLP (57) ABSTRACT

The present invention relates to a propeller drive arrangement for vessels used in water-borne traffic, and specifically to a propeller drive arrangement containing a propulsion unit, and to such an arrangement, which contains a propulsion unit, which is turnable relative the hull of the vessel. Particularly the present invention relates to a system and a method for braking a motor of a propulsion unit. The solution for braking the propulsion unit according to the present invention is based on short-circuiting a permanently magnetized motor.

26 Claims, 9 Drawing Sheets

SYSTEM AND METHOD FOR BRAKING A MOTOR OF A PROPULSION UNIT

CROSS-REFERENCE TO RELATED APPLICATION

This application is a National Stage entry of International Application No. PCT/FI03/00244, filed Mar. 28, 2003, the entire specification claims and drawings of which are incorporated herewith by reference.

FIELD OF THE INVENTION

The present invention relates to a propeller drive arrangement for vessels used in water-borne traffic and specifically to a propeller drive arrangement, which comprises a propulsion unit. The invention further relates to an arrangement comprising a propulsion unit, which is rotatable in relation to the hull of the vessel. The invention further relates to a system and a method for braking, i.e. reducing the speed and/or limiting the motion of a motor of a propulsion unit.

BACKGROUND OF THE PRESENT INVENTION

In the most common cases the propulsion of various ships or equivalent vessels (such as e.g. passenger ships and passenger ferries, cargo ships, barges, oil tankers, ice breakers, off-shore vessels, naval ships etc.) is achieved by a pushing or pulling force produced by a rotatable propeller or several propellers. Separate rudder devices have conventionally been used for steering the vessels.

Conventionally the driving or rotating arrangements for the propellers have been implemented such, that the drive device for the propeller shaft, e.g. a diesel engine, a gas engine or an electric motor is provided inside the hull of the vessel, from which location the propeller shaft extends outside the hull of the vessel through a watertight sealed opening. The propeller itself is located at the other end, i.e. the end extending outside the vessel, of the propeller shaft, which is connected either directly to the motor or to a gearbox, if any. In the majority of all vessels used in water-borne traffic this solution is used for providing the force necessary for their movement.

Figure 1:
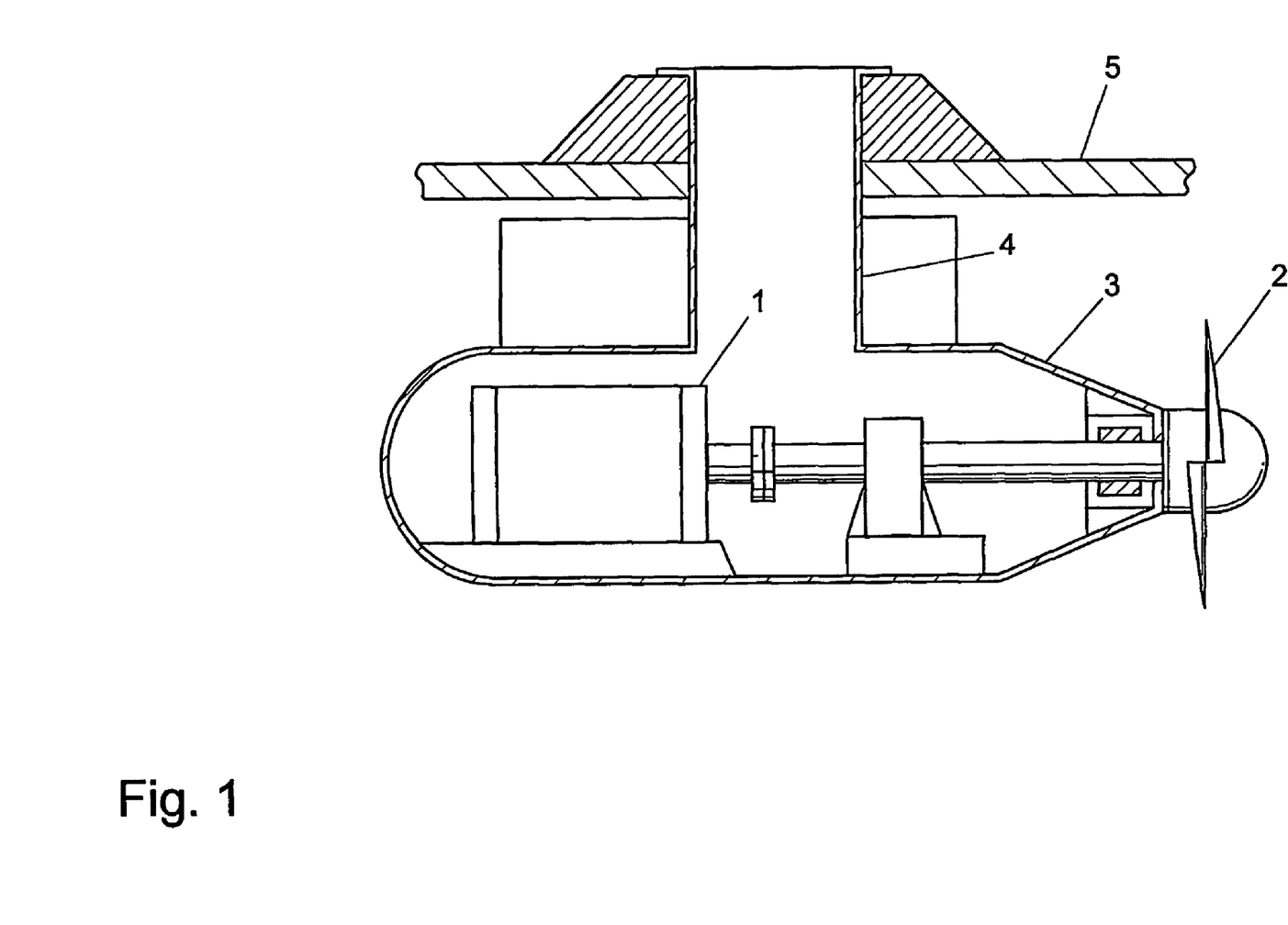
FIG. 1 shows the structure of a propulsion unit according to prior art.
Figure 2:
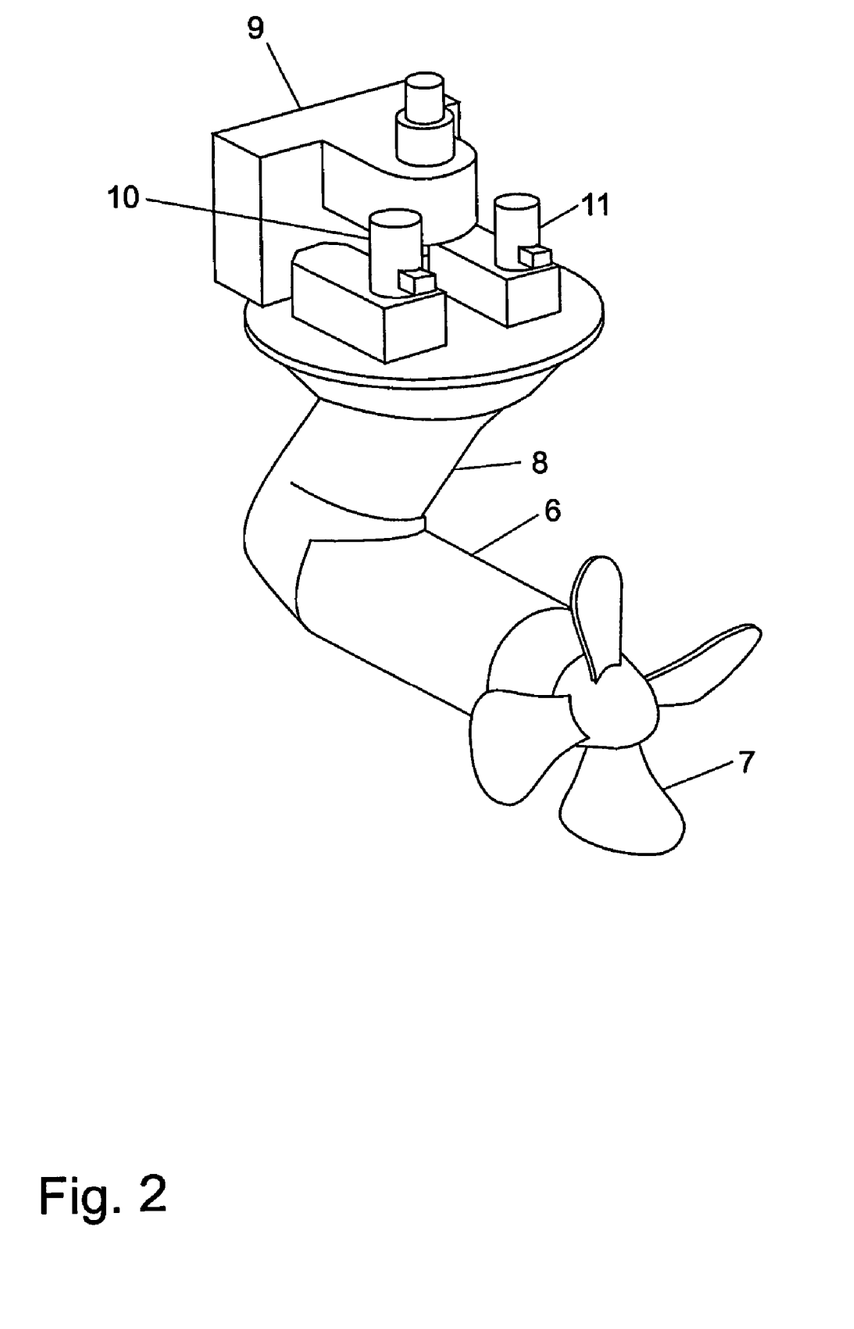
FIG. 2 shows a prior art propulsion unit and its turning arrangement.

Prior art is described below with reference to the accompanying drawings, in which:

FIG. 1 shows the structure of a propulsion unit according to prior art,

FIG. 2 shows a prior art propulsion unit with its turning arrangement, and

Figure 3:
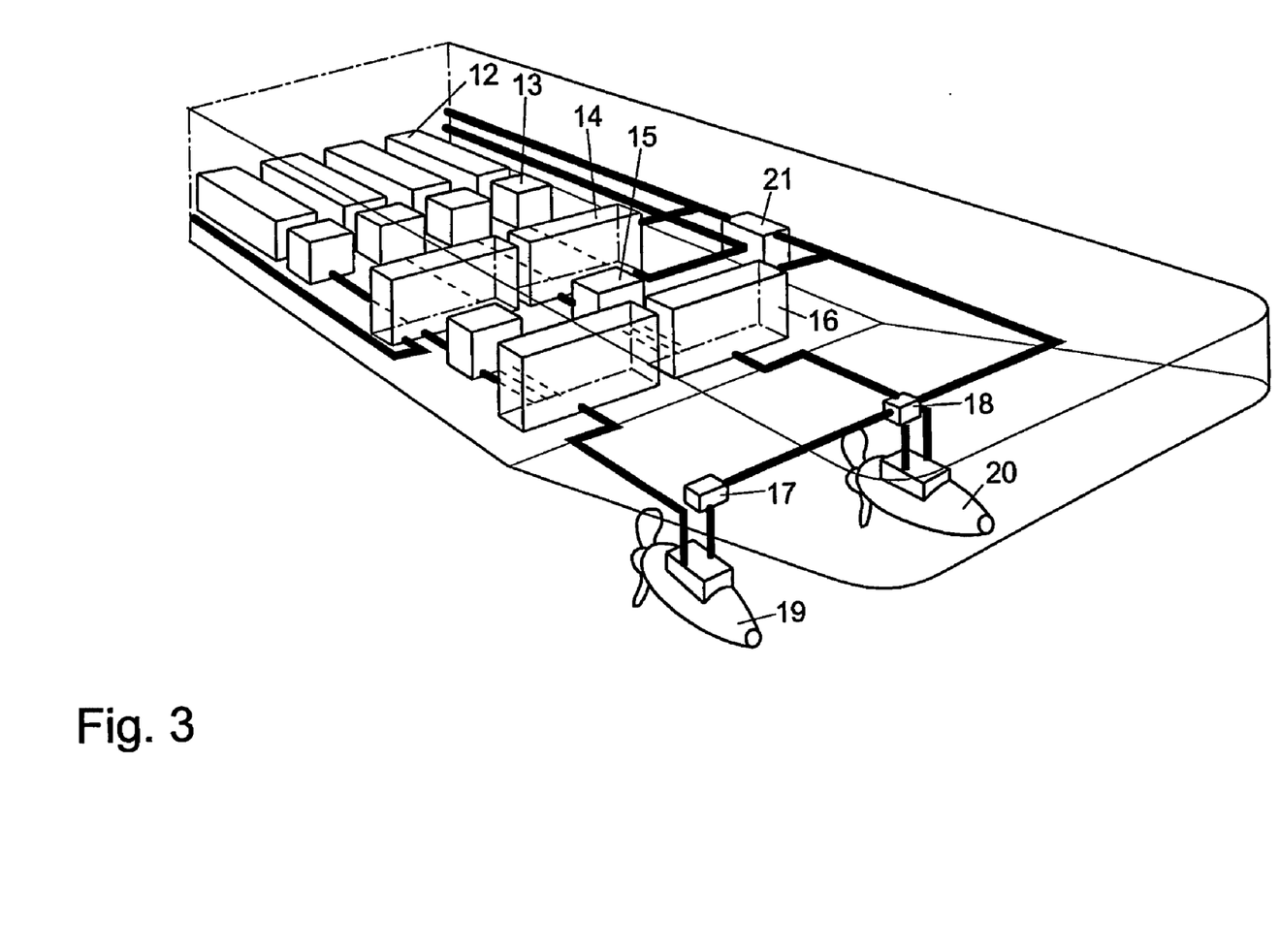
FIG. 3 shows a prior art power supply arrangement for propulsion units.

FIG. 3 shows a prior art arrangement for supplying power to propulsion units.

FIG. 1 shows the structure of a propulsion unit according to prior art. The prior art propulsion unit comprises a motor 1, a propeller 2, and a chamber 3, which is connected to the hull 5 of the ship by a hollow shaft 4. Shipbuilders have lately started to provide vessels with propeller units of the described kind, wherein the motor 1, providing the driving power for the propeller shaft, as well as any gearbox, are disposed inside a special chamber 3, which is located outside the hull 5 of the ship, said chamber 3 being supported rotatably in relation to said hull 5.

The chamber 3, containing the motor 1, is rotatably supported in relation to the hull of the ship by the hollow shaft 4, which is extending through the bottom of the ship. Thus, the unit is turnable relative the hull 5, whereby it, instead of any separate rudder equipment, can also be used for steering the vessel. Among others, the FI patent No. 76977, to the present applicant, discloses such a propulsion unit in more detail. These units are also generally called azimuthing propulsion units, and the present applicant, for example, is offering such azimuthing units under the trade name AZIPOD®.

In addition to the advantages gained from the elimination of a long propeller shaft and separate rudder equipment, these devices have been found to provide essential improvement in the maneuverability of a vessel. The energy economy of the vessel has also been found to become more efficient. In recent years, the use of azimuthing propulsion units in various vessels for water-borne traffic has become more common, and they are assumed to grow increasingly popular.

FIG. 2 shows a prior art propulsion unit with its turning arrangement. The propulsion unit according to prior art comprises a motor unit 6, a propeller 7, a supporting part 8, and a cabling unit 9 and motor units 10, 11 of the turning arrangement. The motor unit 6 and the propeller 7 of the propulsion unit are being supported at the hull of the ship by the supporting part 8. The driving electric power is supplied to the electric motor unit 6 by the cabling unit 9. The motor units 10, 11 of the prior art turning arrangement turn the propulsion unit via a suitable gear set. The prior art propulsion unit also comprises mechanical brake means for reducing and/or limiting the turning speed of the azimuthing propulsion unit.

FIG. 3 shows a power supply arrangement according to prior art for propulsion units. The prior art power supply arrangement for propulsion units comprises engine units 12, generator units 13, electrical power network switching panels 14, transformer units 15 for the propulsion system, frequency converters 16 for the propulsion units, frequency converters 17, 18 for the turning arrangement, propulsion units 19, 20 and a steering system 21.

In the power supply system according to prior art, the engine units 12 produce the power and the generator units 13 convert it to electric energy as input to the electrical power network. In the electrical power network, the electric power is directed, via the switching panels 14 and the transformer units 15 for the propulsion system, to the frequency converters 16 for the propulsion units and the frequency converters 17, 18 for the turning arrangement. The frequency converters 16–18 further establish the driving voltages to the motors for the propellers and the turning arrangements of the propulsion units 19, 20. The task of the steering system 21 is to control the operation of the turning arrangement.

The operating principle of the frequency converter 16–18 is a technique known to a person skilled in the art, and thus it need not be explained here, except by mentioning, that the main general parts of a frequency converter are a rectifier, an intermediate direct-current circuit and an invertor. Presently frequency converters 16–18 are commonly used, for instance, as supply devices for alternating-current motors, while being particularly preferable in various controllable electric drives. Frequency converters called PWM frequency converters (PWM, pulse width modulation), which are based on the pulse width modulation technique and have a so called voltage intermediate circuit, are the frequency converters being utilized the most frequently.

Should one or more of the propellers get damaged, it should be possible to move the vessel for service. The problem is, that should the vessel be moved, the damaged propeller will easily start rotating and causes additional damage to the propulsion device and possibly also to the vessel.

Accordingly, should there occur a break-down in the electric power supply to the motors in the turning arrangement for the propulsion unit, a sudden turning of the propulsion unit might cause additional damage to the propulsion device and possibly also to the vessel. If the propulsion device is free recklessly to turn this way and that, the maneuverability of the vessel is considerably impaired.

In regard to prior art reference is made to U.S. Pat. No. 1,555,244, which presents a solution for dynamic braking of an asynchronous motor, whereby the stator windings are short-circuited in a known manner. Furthermore, in regard to prior art reference is made to U.S. Pat. No. 5,184,049 which presents a solution for reducing the motor stopping time of the optical or magnetic discs by first supplying reverse voltage to and then short-circuiting the stator windings of an ac motor. Furthermore, in regard to prior art reference is made to International patent application WO97/05691 which presents a solution for controlling the servomotor by a PWM converter and the switches of the converter are controlled so that the windings are short-circuited during the braking period. In the prior art references, the asynchronous motors with short-circuited rotors do not produce any torque in zero speed, because there is no rotating magnetic field during in the rotors.

In propulsion units according to prior art, braking, means operating mechanically have been devised. The object of the braking means is to prevent rotation of the propeller and to restrain the propeller essentially in a standard position or, respectively, to prevent the turning movement of the propulsion unit and to restrain the propulsion unit essentially in a standard position.

SUMMARY OF THE PRESENT INVENTION

The object of the present invention is to eliminate the disadvantages of prior art and to provide a novel solution for reducing and/or limiting the speed of a motor of a propulsion unit.

An object of the invention is to provide a solution, in which the use of any separate mechanical brake means and problems related to such means will be avoided.

An object of the invention is to provide a solution, in which the use of any separate mechanical brake means, as the propulsion unit is recklessly turning, can be avoided.

An object of the invention is to provide a solution, by which the reliability and the overall economy of the turning machinery of an azimuthing propulsion unit are improved compared to the known solutions.

According to a first aspect of the present invention a system is provided for reducing the speed and/or limiting the motion of a motor of a propulsion unit, said system comprising a propulsion unit, a propeller, a propeller motor, said propeller motor containing a magnetization device, and a frequency converter connected to an electrical power network, the system being characterized in, that the system further comprises a switch arrangement, which switch arrangement comprises means for disconnecting the propeller motor from the electrical power network and means for essentially short-circuiting the stator windings of the propeller motor.

Preferably, when a need for braking the propeller motor is detected, first, the propeller motor is disconnected from the electrical power network, after which the stator windings of the propeller motor are switched into a short-circuit. Alternatively, when a need for braking the propeller motor is detected, first, the propeller motor is disconnected from the electrical power network, after which the stator windings of the propeller motor are switched into a short-circuit within the frequency converter. Preferably the short-circuit is switched using semiconductors.

Preferably, the short-circuit is implemented such, that the stator windings of the propeller motor simultaneously are also connected to equipment ground. Preferably, the switch arrangement is controlled by a control section of the frequency converter.

Preferably, a synchronous motor is used as the propeller motor of the propulsion unit. Preferably, the braking system is implemented for switching more than one propulsion unit.

According to another aspect of the invention, a system is provided for reducing the speed and/or limiting the motion of a motor of a propulsion unit, said system comprising a propulsion unit, a propeller, motor units of the turning arrangement, said motor units containing a magnetization device, and a frequency converter connected to an electrical power network, the system being characterized in, that the system further comprises a switch arrangement, which switch arrangement comprises means for disconnecting the motor units from the electrical power network and means for essentially short-circuiting the stator windings of motor units.

Preferably, when a need for braking the motor units is detected, first, the motor units are disconnected from the electrical power network, after which the stator windings of the motor units are switched into a short-circuit. Alternatively, when a need for braking the motor units is detected, first, the motor units are disconnected from the electrical power network, after which the stator windings of the motor units are switched into a short-circuit within the frequency converter. Preferably the short-circuit is switched using semiconductors.

Preferably, the short-circuit is implemented such, that the stator windings of the motor units simultaneously are also connected to equipment ground. Preferably, the switch arrangement is controlled by a control section of the frequency converter.

Preferably, synchronous motors are used as the motor units of the turning arrangement of the propulsion unit. Preferably, the braking system is implemented for switching more than one propulsion unit.

According to a third aspect of the invention, a method is provided for reducing the speed and/or limiting the motion of a motor of a propulsion unit in a system comprising a propulsion unit, a propeller, a propeller motor, said propeller motor containing a magnetization device, and a frequency converter connected to an electrical power network, and a switch arrangement, the method being characterized in that first, a need for braking a propeller motor is detected, next, the propeller motor is disconnected from the electrical power network, after which the stator windings of the propeller motor are short-circuited.

Preferably, before the stator windings of the propeller motor are short-circuited, a check is made to ensure, that the propeller motor is disconnected from the electrical power network. Preferably, the braking method is implemented for switching more than one propulsion unit.

According to a fourth aspect of the invention a method is provided for reducing the speed and/or limiting the motion of a motor of a propulsion unit in a system comprising a propulsion unit, a propeller, motor units of the turning arrangement, said motor units containing a magnetization device, and a frequency converter connected to an electrical power network, and a switch arrangement, the method being characterized in that first, a need for braking motor units is detected, next, the motor units are disconnected from the electrical power network, after which the stator windings of the motor units are short-circuited.

Preferably, before the stator windings of the motor units are short-circuited, a check is made to ensure, that the motor units are disconnected from the electrical power network. Preferably, the braking method is implemented for switching more than one propulsion unit.

Several considerable advantages are achieved by the present invention. It enables the replacement of the known system based on the use of mechanical brake means and thus the elimination of the problem items mentioned above.

There is good overall economy in the solution based on utilizing the electric motor. The braking arrangement based on the electric drive is also extremely reliable.

The basic elements needed for the braking solution based on the use of an electric motor already exist in modern vessels, and, accordingly, the construction of a separate mechanical braking system is avoided.

BRIEF DESCRIPTION OF THE DRAWINGS

The present invention is described below in detail with reference to the accompanying figures, in which.

FIGS. 1–3 were described above. The solution according to the present invention is presented below with reference to FIGS. 4–9, which show the implementation of a solution according to the present invention.

DETAILED DESCRIPTION OF SPECIFIC EMBODIMENTS

Figure 4:
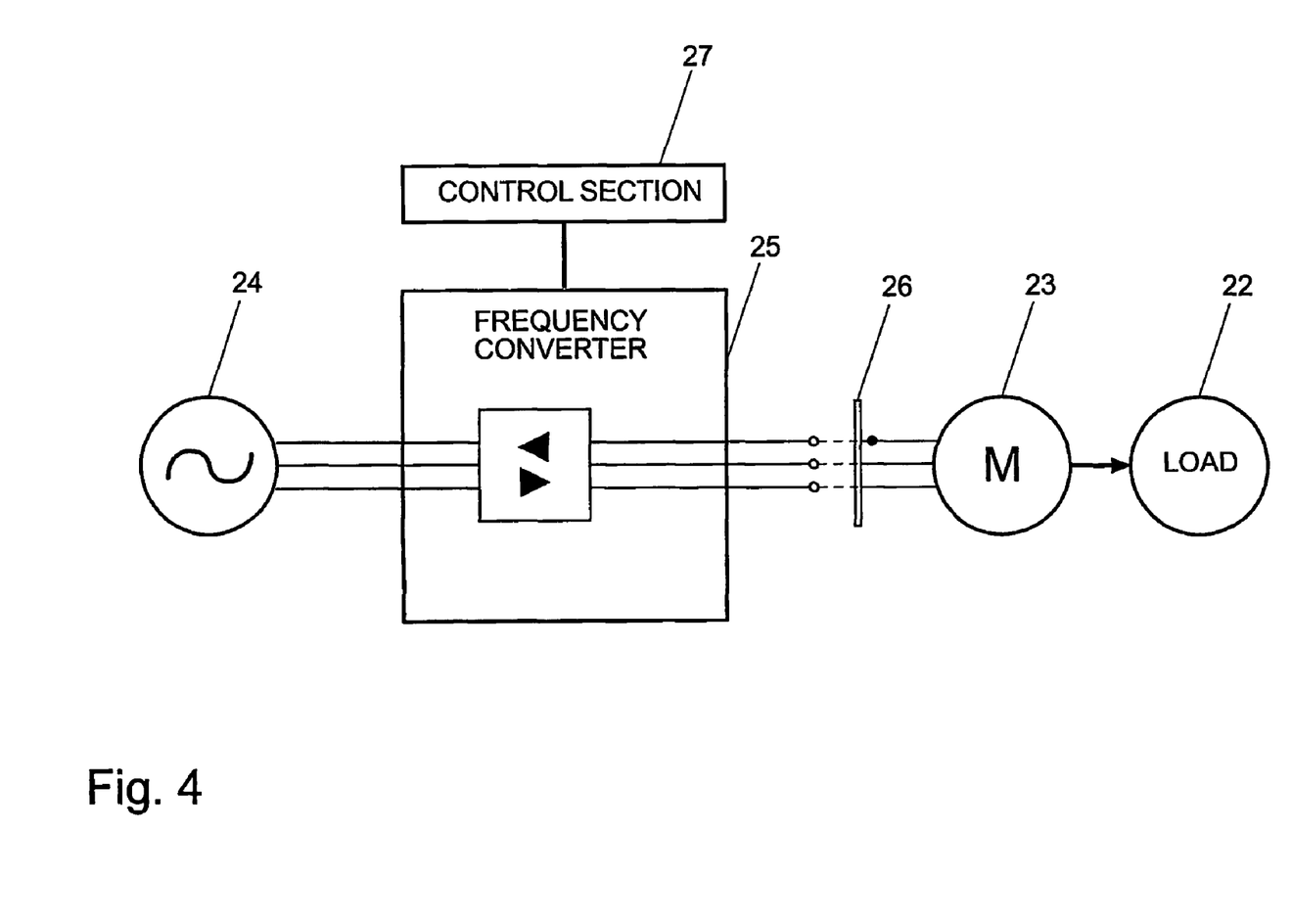
FIG. 4 shows a system according to the present invention for braking a motor of a propulsion unit.

FIG. 4 shows a system according to the present invention for braking a motor of a propulsion unit. The braking system for a motor of a propulsion unit according to the invention comprises a load 22 of the propulsion unit, a permanently magnetized motor 23 of the propulsion unit, a frequency converter 25 connected to an electrical power network 24, and a switch arrangement 26. As the load 22 there may be either a propeller 22 or a turning device 22 for the propulsion unit.

Reference number 27 indicates a control section of the frequency converter.

The switch arrangement 26, according to the present invention, of the braking system for the motor of the propulsion unit comprises means for disconnecting the motor 23 from the electrical power network, and means for short-circuiting the stator windings of the permanently magnetized motor 23. When a need for braking the motor 23 is detected, first the motor 23 is disconnected from the electrical power network. Subsequently he stator windings of the motor 23 are switched into a short-circuit. The short-circuit can also be implemented such, that the stator windings of the motor 23 simultaneously are connected to equipment ground.

The switch arrangement 26 can be controlled e.g. by the control section 27 of the frequency converter. For example a synchronous motor 23 can be utilized as the permanently magnetized motor 23 of the propulsion unit. The motor units 10, 11 of the turning arrangement can, for example, also constitute the permanently magnetized motors 23. The braking method, according to the present invention, for a motor of a propulsion unit can also be implemented for switching more than one motor.

Figure 5:
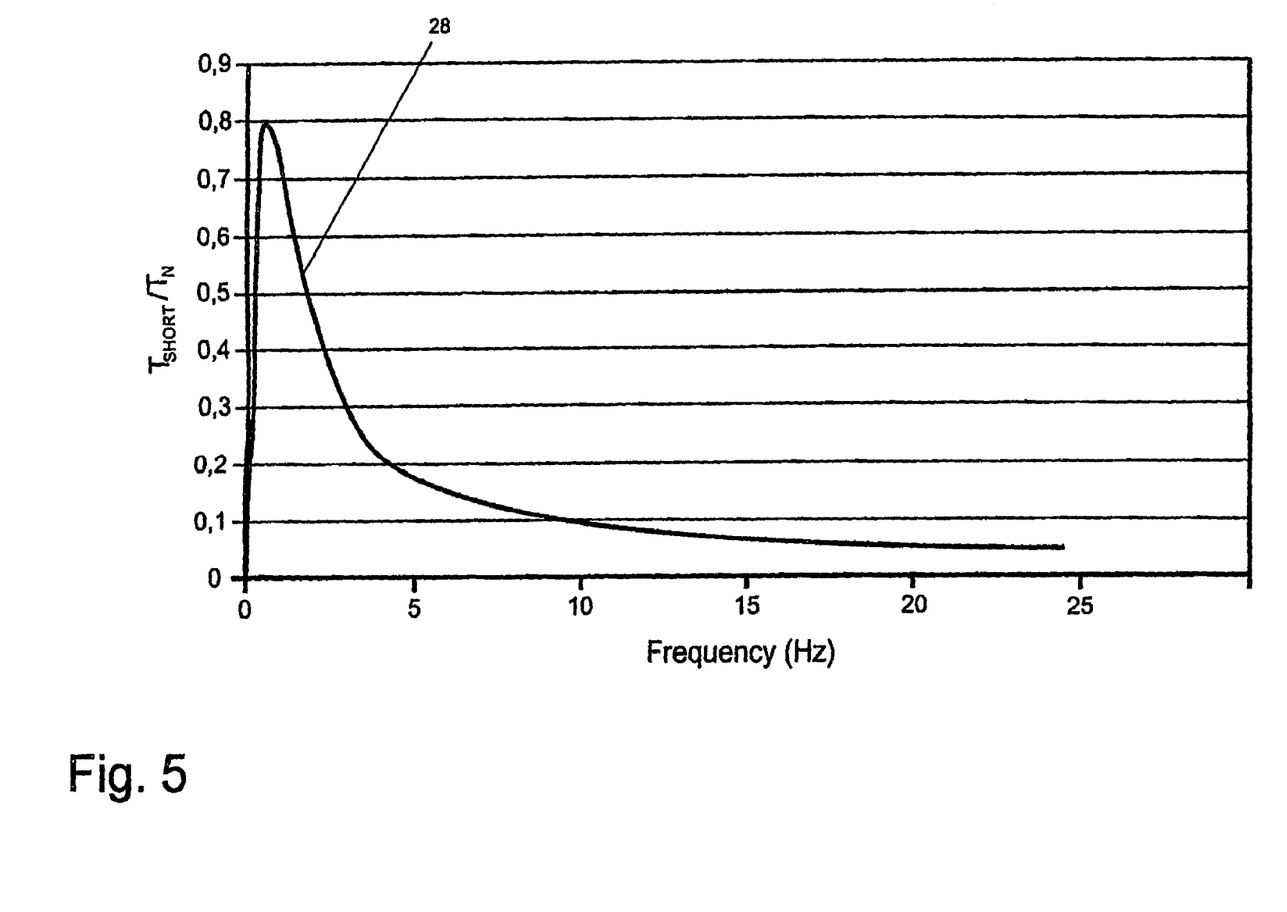
FIG. 5 shows a typical short-circuit curve for a permanently magnetized motor of a propulsion unit according to the present invention.

FIG. 5 shows a typical short-circuit curve of a permanently magnetized motor of a propulsion unit according to the present invention. The short-circuit curve of the motor is indicated by the reference numeral 28. When the stator windings of the permanently magnetized motor are short-circuited, the short-circuit moment is so large, that it is generously sufficient for resisting the moments induced by the ship's movements and sea currents. Thus at all times one stays to the left of the moment curve's peak value. The rotational speed of the propeller is then less than 10% of its nominal speed, typically about 2–5% of the nominal speed.

Figure 6:
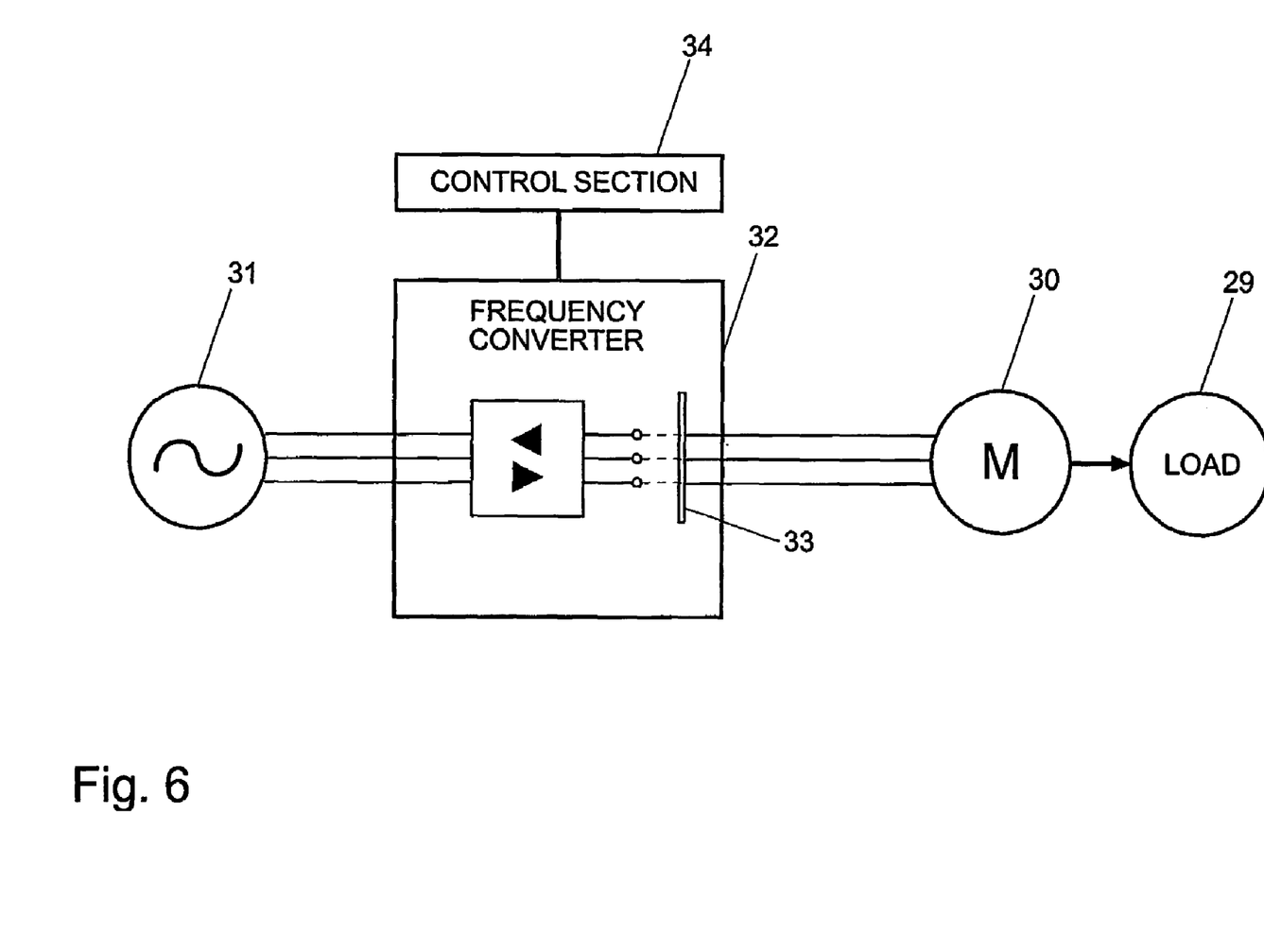
FIG. 6 shows an alternative system according to the present invention for braking a motor of a propulsion unit.

FIG. 6 shows an alternative system, according to the present invention, for braking a motor of a propulsion unit. The alternative braking system, according to the present invention, for a motor of a propulsion unit comprises a propeller 29, a permanently magnetized motor 30 of the propulsion unit, a frequency converter 32 connected to an electrical power network 31, and a switch arrangement 33. A control section of the frequency converter is indicated by the reference numeral 34.

The switch arrangement 33 of the braking system, according to the present invention, for a motor of a propulsion unit comprises means for disconnecting the motor 30 from the electrical power network and means for short-circuiting the stator windings of the permanently magnetized motor 30. When a need for braking the motor 30 is detected, first, the motor 30 is disconnected from the electrical power network. After that, the stator windings of the permanently magnetized motor 30 are switched into a short-circuit within the frequency converter 32.

The short-circuit implemented within the frequency converter can be switched also using semiconductors. For example, a synchronous motor 30 can be used as the permanently magnetized motor 30 of the propulsion unit. The short-circuit can also be implemented such, that the stator windings of the motor 30 simultaneously are connected to equipment ground.

The switch arrangement 33 can be controlled, for example, by a control section 34 of the frequency converter. The motor units 10, 11 of the turning arrangement, for example, can here also constitute the permanently magnetized motors 30. The braking system, according to the present invention, for a motor of a propulsion unit can also be implemented for switching more than one propulsion unit.

Figure 7:
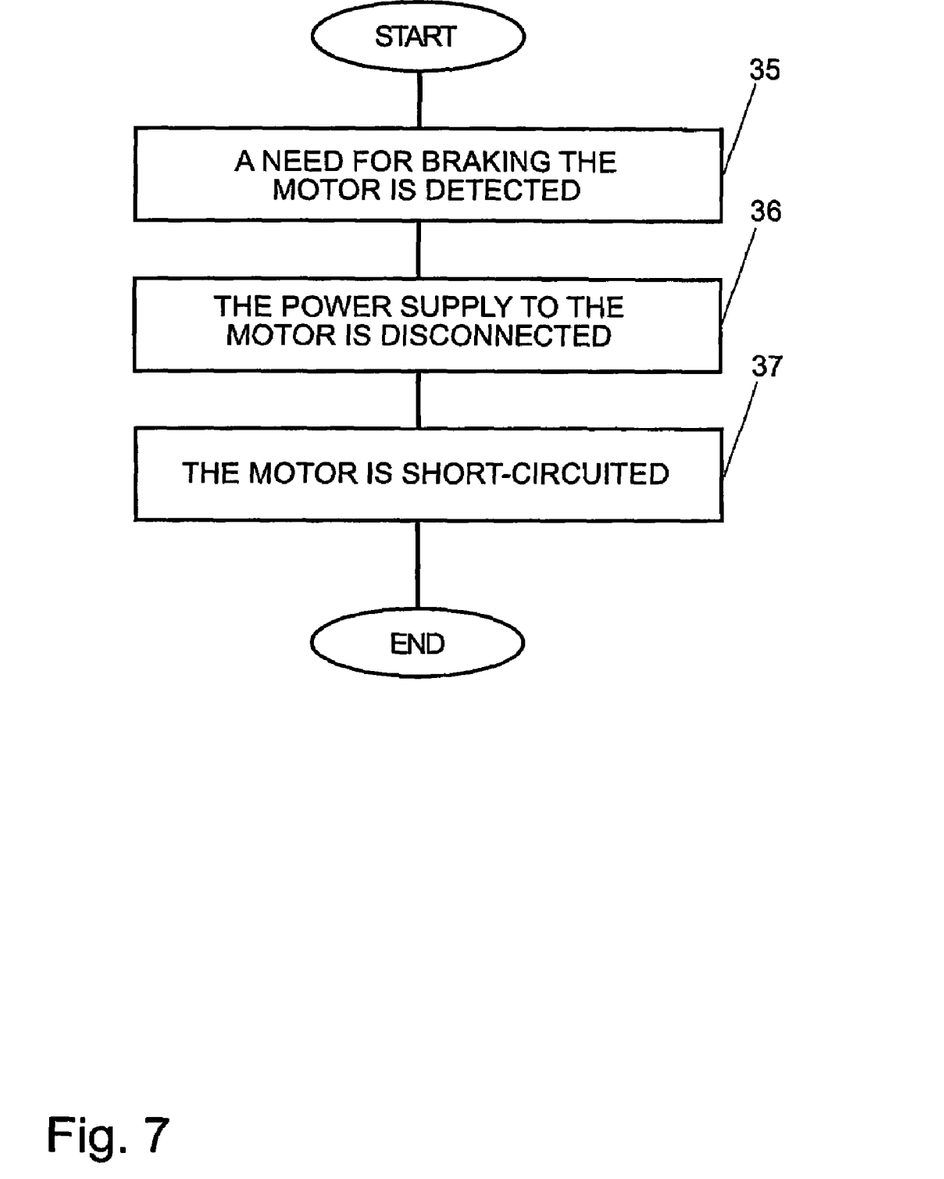
FIG. 7 shows a method according to the present invention for braking a motor of a propulsion unit.

FIG. 7 shows a method according to the present invention for braking a motor of a propulsion unit. The braking system for a motor of a propulsion unit according to the invention comprises a propeller, a permanently magnetized motor of the propulsion unit, a frequency converter connected to an electrical power network, and a switch arrangement. In the method according to the present invention, first, a need for braking the motor is detected 35. When the need for braking has been detected, the motor is disconnected 36 from the electrical power network. After that, the stator windings of the motor are short-circuited 37. The method for braking a motor of a propulsion unit according to the present invention can also be implemented for switching more than one motor.

Figure 8:
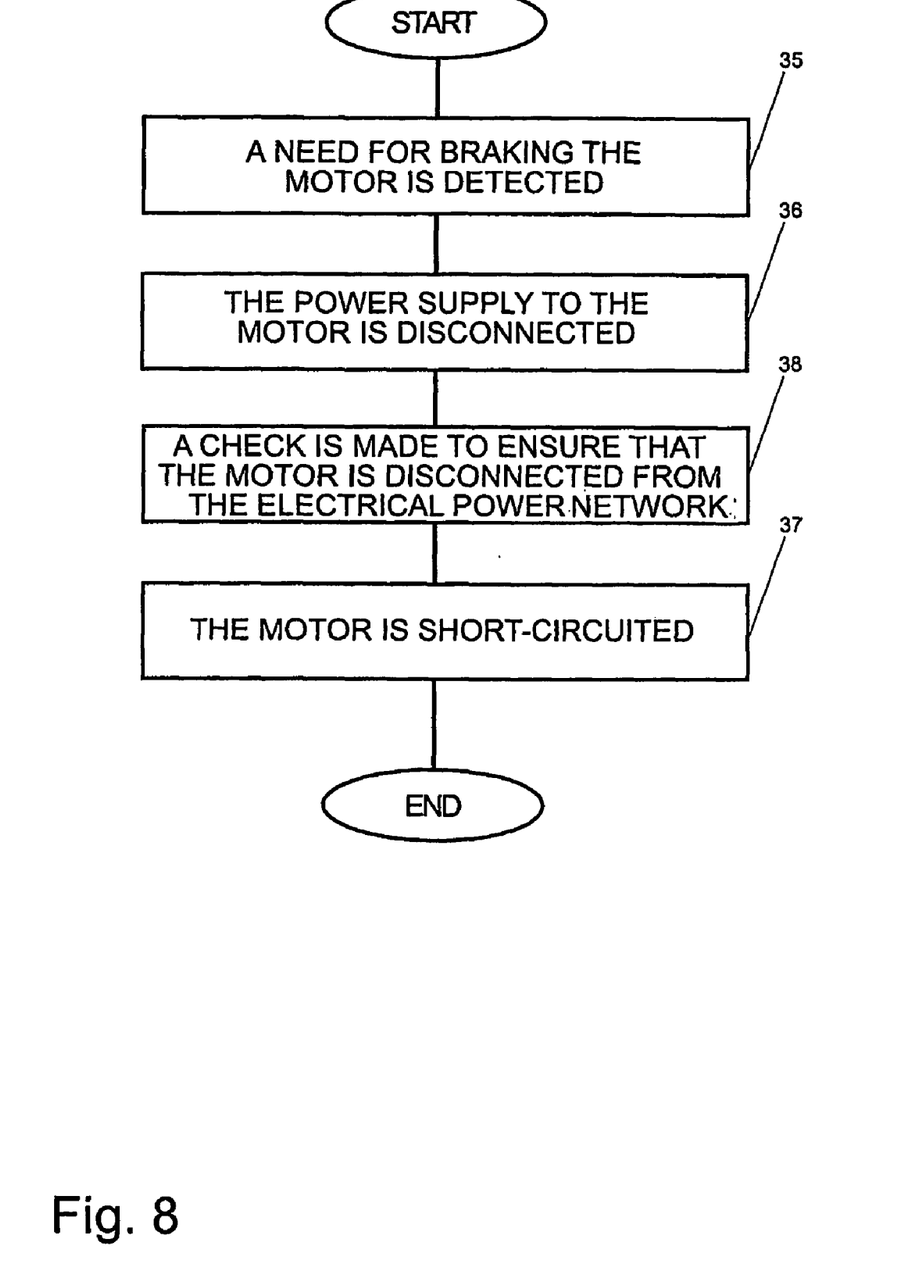
FIG. 8 shows an alternative method according to the present invention for braking a motor of a propulsion unit.

FIG. 8 shows an alternative method, according to the present invention, for braking a motor of a propulsion unit. The braking system for a motor of a propulsion unit according to the invention comprises a propeller, a permanently magnetized motor of the propulsion unit, a frequency converter connected to an electrical power network, and a switch arrangement. In the method according to the present invention, first, a need for braking the motor is detected 35.

When the need for braking has been detected, the motor is disconnected 36 from the electrical power network. After the motor has been disconnected from the electrical power network, the disconnection of the motor from the electrical power network is checked 38. After that, the stator windings of the motor are short-circuited 37. The method for braking a motor of a propulsion unit, according to the present invention, can also be implemented for switching more than one propulsion unit.

Figure 9:
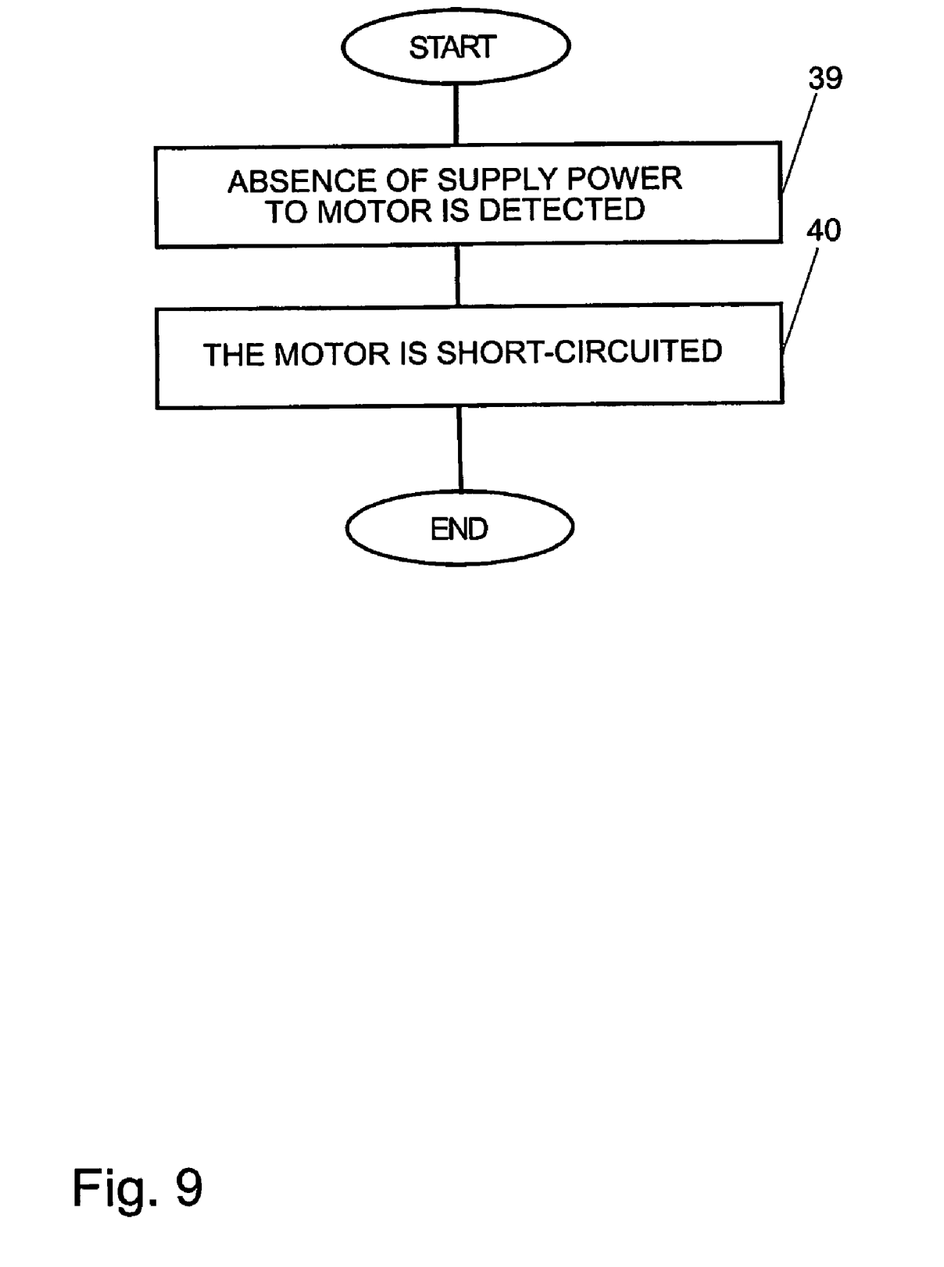
FIG. 9 shows another alternative method according to the present invention for braking a motor of a propulsion unit.

FIG. 9 shows another alternative method, according to the present invention, for braking a motor of a propulsion unit. The braking system for a motor of a propulsion unit according to the invention comprises a propeller, a permanently magnetized motor of the propulsion unit, a frequency converter connected to an electrical power network, and a switch arrangement. The motor units 10, 11 of the turning arrangement, for example, can here also constitute the permanently magnetized motors. In the method according to the present invention, first, absence of supply power to the motor is detected 39. When absence of supply power has been detected, the stator windings of the motor are short-circuited 40. The alternative method for braking a motor of a propulsion unit according to the present invention can also be implemented for switching more than one propulsion unit.

Thus, a device and a method have been provided by the present invention, by which a novel solution for braking a motor of a propulsion unit of a vessel is achieved. By the solution, several disadvantages of prior art are avoided, while achieving an advantage with regard to a simpler design and a better overall economy as well as ease of use and operational reliability.

It is to be appreciated, that the examples of embodiments of the present invention presented above are not limiting the scope of the invention as defined in the patent claims, but rather that the claims are intended to cover all modifications, similarities and alternatives included in the spirit and scope of the invention as defined in the accompanying patent claims.

The invention claimed is:

1. A system for at least one of limiting the motion of a rotor of a propeller motor of a propulsion unit and restraining the angular position of a rotor of a propeller motor of a propulsion unit, said the system comprising:
    at least one propulsion unit comprising:
        a propeller; and
        a propeller motor comprising a magnetization device and stator windings,
    an electrical power network;
    a frequency converter connected to an electrical power network; and
    a switch arrangement disconnecting the propeller motor from the electrical power network and for short-circuiting the stator windings of the propeller motor to restrain the angular position of the rotor of the propeller motor of the propulsion unit.

2. The system according to claim 1, wherein the switch arrangement is configured to disconnect the propeller motor from the electrical power network, before short-circuiting the stator windings of the propeller motor.

3. The system according to claim 1, wherein the switch arrangement is configured to disconnect the propeller motor from the electrical power network, before short-circuiting the stator windings of the propeller motor within the frequency converter.

4. The system according to claim 1, wherein the switch arrangement for disconnecting the propeller motor from the electrical power network and for short-circuiting the stator windings of the propeller motor comprises at least one semiconductor.

5. The system, according to claim 1, wherein the switch arrangement is configured to disconnect the propeller motor from the electrical power network, to short-circuit the stator windings of the propeller motor, and to ground the stator windings of the propeller motor.

6. The system according to claim 1, wherein a control section of the frequency converter controls the switch arrangement.

7. The system according to claim 1, wherein the propeller motor is a synchronous motor.

8. The system according to claim 1, wherein the switch arrangement is configured to disconnect the propeller motor from the electrical power network, to ensure that the propeller motor is disconnected from the electrical power network, and to short-circuit the stator windings of the propeller motor.

9. A system according to claim 1, wherein the switch arrangement is configured to ensure that the propeller motor is disconnected from the electrical power network before short-circuiting the stator windings of the propeller motor.

10. A system for at least one of reducing the speed and limiting the motion of a motor of a propulsion unit, the system comprising:
    at least one propulsion unit comprising:
        a propeller; and
        a turning arrangement including at least one motor unit for turning the propulsion unit, the at least one motor unit including a magnetization device and stator windings;
    an electrical power network;
    a frequency converter connected to the electrical power network; and
    a switch arrangement for disconnecting the at least one motor unit of the turning arrangement for turning the propulsion unit from the electrical power network and for short-circuiting the stator windings of the at least one motor unit of the turning arrangement for turning the propulsion unit to restrain the angular position of the rotor of the propeller motor of the propulsion unit.

11. The system according to claim 10, wherein the switch arrangement is configured to disconnect the at least one motor unit from the electrical power network, before short-circuiting the stator windings of the at least one motor unit.

12. The system according to claim 10, wherein the switch arrangement is configured to disconnect the at least one motor unit from the electrical power network, before short-circuiting the stator windings of the at least one motor unit within the frequency converter.

13. The system according to claim 10, wherein the switch arrangement for disconnecting the at least one motor unit from the electrical power network and for short-circuiting the stator windings of the at least one motor unit comprises at least one semiconductor.

14. The system, according to claim 10, wherein the switch arrangement is configured to disconnect the at least one motor unit from the electrical power network, to short circuit the stator windings of the at least one motor unit, and to ground the stator windings of the at least one motor unit.

15. The system according to claim 10, wherein a control section of the frequency converter controls the switch arrangement.

16. The system according to claim 10, wherein the at least one motor unit is a synchronous motor.

17. The system according to claim 10, wherein the switch arrangement is configured to disconnect the at least one motor unit from the electrical power network, to ensure that the at least one motor unit is disconnected from the electrical power network, and to short-circuit the stator windings of the at least one motor unit.

18. A system according to claim 10, wherein the switch arrangement is configured to ensure that the at least one motor unit is disconnected from the electrical power network before short-circuiting the stator windings of the at least one motor unit.

19. A method for at least one of limiting the motion of a rotor of a propeller motor of a propulsion unit and restraining the angular position of a rotor of a propeller motor of a propulsion unit in a system having at least one propulsion unit, the at least one propulsion unit including a propeller and a propeller motor including a magnetization device and stator windings, an electrical power network, a frequency converter connected to the electrical power network, and a switch arrangement, the method comprising:
  detecting a need for braking the propeller motor;
  disconnecting the propeller motor from the electrical power network;
  short-circuiting the stator windings of the propeller; and
  restraining the angular position of the rotor of the propeller motor of the propulsion unit.

20. The method according to claim 19, the method further comprising:
  ensuring that the propeller motor is disconnected from the electrical power network before short-circuiting the stator windings of the propeller motor.

21. A method for at least one of reducing the speed and limiting the motion of a motor of a propulsion unit in a system having at least one propulsion unit including a propeller, a turning arrangement including at least one motor unit for turning the propulsion unit, the at least one motor unit including a magnetization device and stator windings, an electrical power network, a frequency converter connected to the electrical power network, and as switch arrangement, the method comprising the steps of:
  detecting a need for braking the at least one motor unit;
  disconnecting the at least one motor unit of the turning arrangement for turning the propulsion unit from the electrical power network; and
  short-circuiting the stator windings of the at least one motor unit of the turning arrangement for turning the propulsion unit to restrain the angular position of the rotor of the propeller motor of the propulsion unit.

22. The method according to claim 21, the method further comprising:
  ensuring that the at least one motor unit is disconnected from the electrical power network before short-circuiting the stator windings of the at least one motor unit.

23. A system for at least one of reducing the speed and limiting the motion of a motor of a propulsion unit, the system comprising:
  at least one propulsion unit comprising:
    a propeller; and
    a propeller motor comprising a magnetization device and stator windings;
  an electrical power network;
  a frequency converter connected to the electrical power network; and
  a switch arrangement for detecting absence of supply power to the propeller motor and for short-circuiting the stator windings of the propeller motor to restrain the angular position of a rotor of the propeller motor of the propulsion unit.

24. A system for at least one of reducing the speed and limiting the motion of a motor of a propulsion unit, the system comprising:
  at least one propulsion unit comprising:
    a propeller; and
    a turning arrangement including at least one motor unit for turning the propulsion unit, the at least one motor unit including a magnetization device and stator windings;
  an electrical power network;
  a frequency converter connected to the electrical power network; and
  a switch arrangement for detecting absence of supply power to the at least one motor unit of the turning arrangement for turning the propulsion unit from the electrical power network and for short-circuiting the stator windings of the at least one motor unit of the turning arrangement for turning the propulsion unit to restrain the angular position of a rotor of the propeller motor of the propulsion unit.

25. A method for at least one of reducing the speed and limiting the motion of a motor of a propulsion unit in a system having at least one propulsion unit including a propeller, and a propeller motor comprising a magnetization device and stator windings, an electrical power network, a frequency converter connected to the electrical power network, and a switch arrangement, the method comprising the steps of:
  detecting absence of electrical supply power to the propeller motor; and
  short-circuiting the stator windings of the propeller motor; and
  restraining the angular position of a rotor of the propeller motor of the propulsion unit.

26. A method for at least one of reducing the speed and limiting the motion of a motor of a propulsion unit in a system having at least one propulsion unit including a propeller, and a turning arrangement including at least one motor unit for turning the propulsion unit, the at least one motor unit including a magnetization device and stator windings, an electrical power network, a frequency converter connected to the electrical power network, and a switching arrangement, the method comprising the steps of:
  detecting absence of supply power to the at least one motor unit of the turning arrangement for turning the propulsion unit from the electrical power network; and
  short-circuiting the stator windings of the at least one motor unit of the turning arrangement for turning the propulsion unit; and
  restraining the angular position of a rotor of the propeller motor of the propulsion unit.

* * * * *